United States Patent [19]

Shay et al.

[11] Patent Number: 5,323,454
[45] Date of Patent: Jun. 21, 1994

[54] TELEPHONE JUNCTION ENCLOSURE AND SYSTEM FOR SEALING A WIRE OPENING ARRAY

[75] Inventors: Francis J. Shay, Palmyra; Robert E. Stough, Harrisburg; Edward R. Koot; Carl M. Bruckner, both of Washington, all of Pa.

[73] Assignee: The Whitaker Corporation, Wilmington, Del.

[21] Appl. No.: 839,970

[22] Filed: Feb. 21, 1992

[51] Int. Cl.$^5$ .......................... H04M 1/18; H02G 3/08
[52] U.S. Cl. .................................. 379/327; 379/328; 379/330; 174/59; 361/600; 361/641
[58] Field of Search .......................... 379/327, 328, 330; 174/59, 65 R, 60; 361/331, 356, 428, 425, 600, 641, 651, 657, 658, 826, 827, 822; 220/3.8, 4.31, 4.02, 351

[56] References Cited

U.S. PATENT DOCUMENTS

| | | |
|---|---|---|
| 1,422,910 | 7/1922 | Young et al. |
| 2,078,991 | 5/1937 | Baker ............................ 247/7 |
| 2,956,106 | 10/1960 | Hasselhorn et al. ............. 174/59 |
| 3,945,530 | 3/1976 | Bozich ............................ 220/329 |
| 4,129,743 | 12/1978 | Lohsl ............................ 174/38 |
| 4,304,957 | 12/1981 | Slater et al. ............... 174/65 R |
| 4,644,095 | 2/1987 | Bright et al. .................. 174/50 |
| 4,658,422 | 4/1987 | Sparks ............................ 379/442 |
| 4,694,118 | 9/1987 | Schmidt ........................ 174/41 |
| 4,861,283 | 8/1989 | Beaulieu et al. ............... 439/540 |
| 4,890,318 | 12/1989 | Crane et al. ..................... 379/399 |
| 4,945,560 | 7/1990 | Collins et al. ................... 379/399 |
| 4,988,834 | 1/1991 | Birch ............................ 174/93 |
| 5,006,077 | 4/1991 | Loose et al. .................... 439/409 |

FOREIGN PATENT DOCUMENTS 595916 10/1925 France.
91/01578 2/1991 PCT Int'l Appl..

OTHER PUBLICATIONS

Bellcore Technical Advisory TA-NWT-000014, Issue 3, Nov. 1990, "Generic Requirements for Aerial Cable Terminals", Bell Communications Research, Morristown, N.J..
Raychem Product Directory 1990-1991, "DTerminator PMT: Rotary Connection System for Pole Mounted Terminals", unnumbered page; Raychem Corporation, Fuquay-Varina, N.C..
Raychem Brochure, "DTerminator PMT: Rotary Connection System for Pole Mounted Terminals"; two pages, undated, Raychem Corporation, Fuquay-Varina N.C..
Raychem Instructions, "DTerminator PMT Pole Mounted Terminal"; Preliminary II Jul. 1989, three pages; Raychem Corporation, Fuquay-Varina, N.C..
Reliance Comm/Tec Reliable Electric Catalog, pp. 25 to 34, (1991); Reliance Comm/Tech, Franklin Park, Ill..
Communications Technology Brochure, "Drop Wire Terminal Ordering Information for NYNEX", four pages (1990); Communications Technology Corporation, Dallas, Tex..
Communications Technology Brochure, "The New POLECAT Pole Mounted Terminal", four pages (1989); Communications Technology Corporation, Dallas, Tex..
AT&T Brochure, "Outside Plant Systems", pp. ii, iii, 5-3 to 5-4; Feb. 1987; AT&T Network Systems, Greensboro, N.C..

Primary Examiner—James L. Dwyer
Assistant Examiner—Hannah Lim
Attorney, Agent, or Firm—Anton P. Ness

[57] ABSTRACT

An enclosure (10) for junctions of telephone service wires (18,19) and a stub cable (16) includes a rear panel member (20) and a front cover (100) adapted to be slid downwardly to expose the interior of the enclosure for wire interconnection and servicing. Wire-receiving openings (40,42) of the enclosure are organized in linear arrays and are sealed by a pair of elastomeric strips (80,90;44,46) held against the enclosure wall by bracket members (50,48), with one strip (90) having small diameter holes (92) for just fitting around a wire, and the other (80) having slits (82) which remain closed if no wire is inserted into a particular opening, with both the small diameter holes and slits aligned between the enclosure openings and openings (52) through the bracket members. Certain bracket members (50) are mounted to the outer surface of the rear wall (22) of the rear panel member (20) along side edges (32) thereof to define vertical channels (66), and flanges (118,120) of side walls (112,114) of the front cover (100) fit thereinto for guided sliding of the front cover during opening and closing.

14 Claims, 7 Drawing Sheets

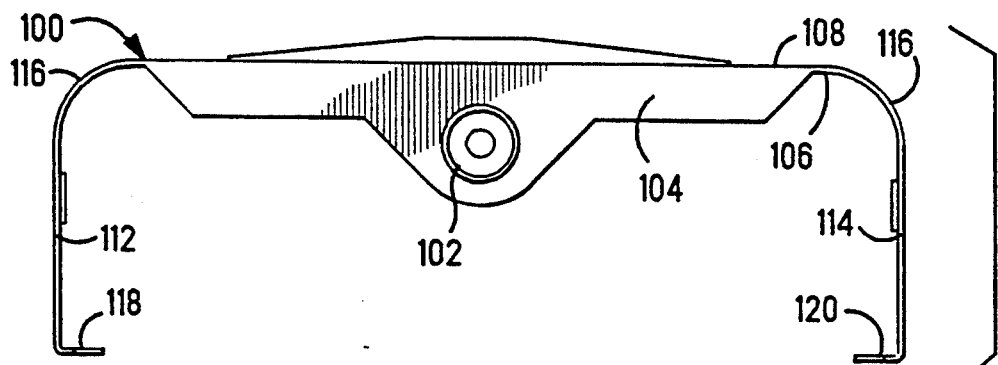
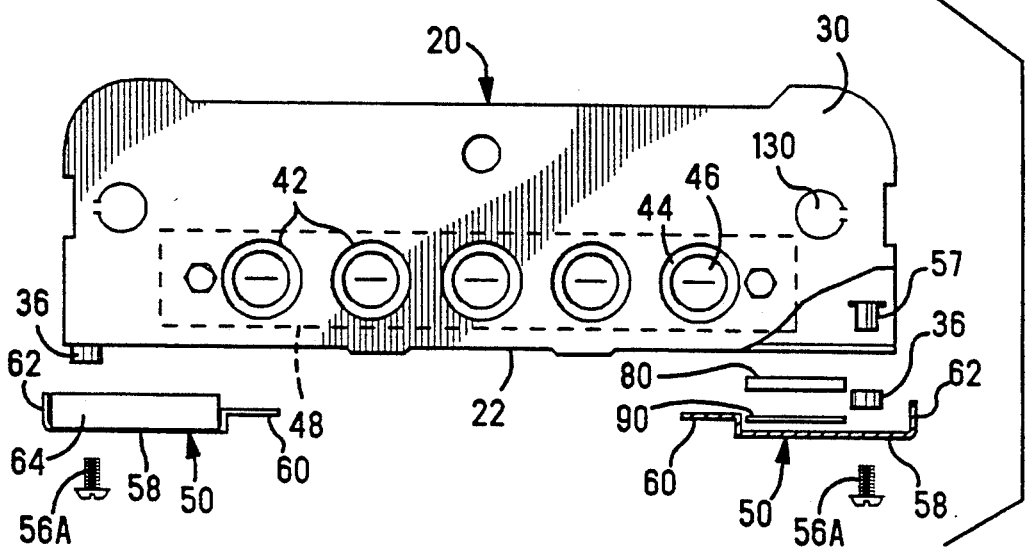
FIG. 4
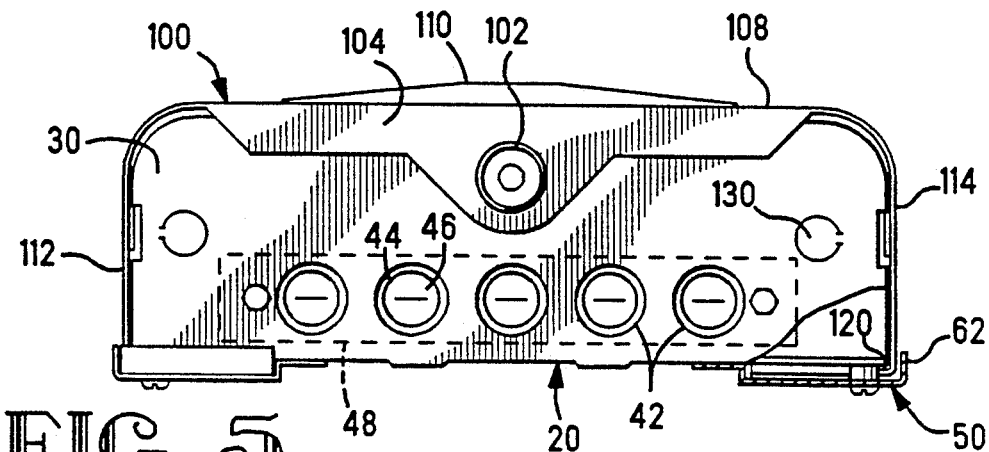
FIG. 5

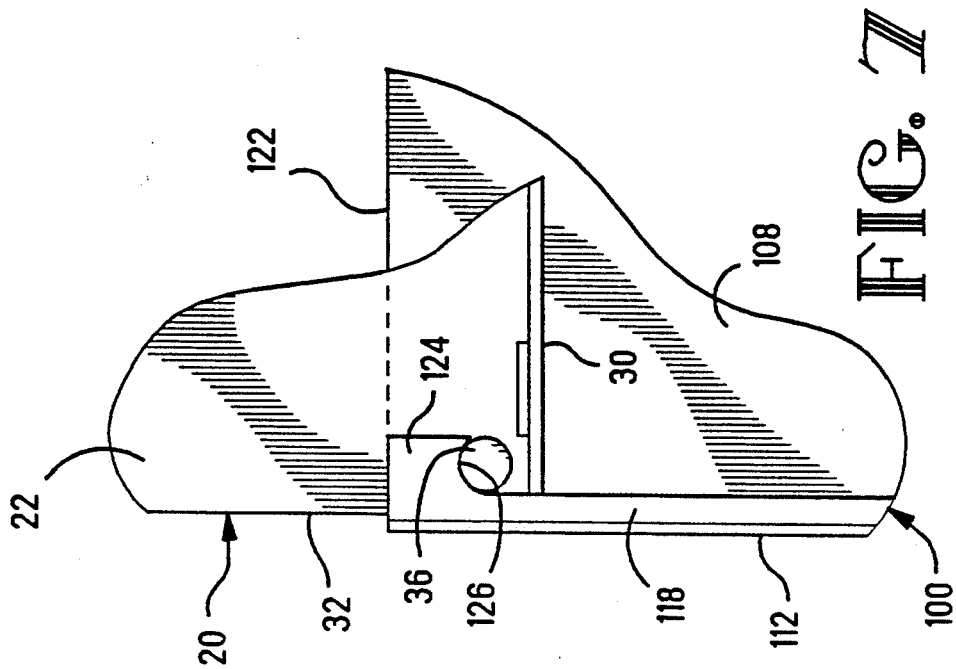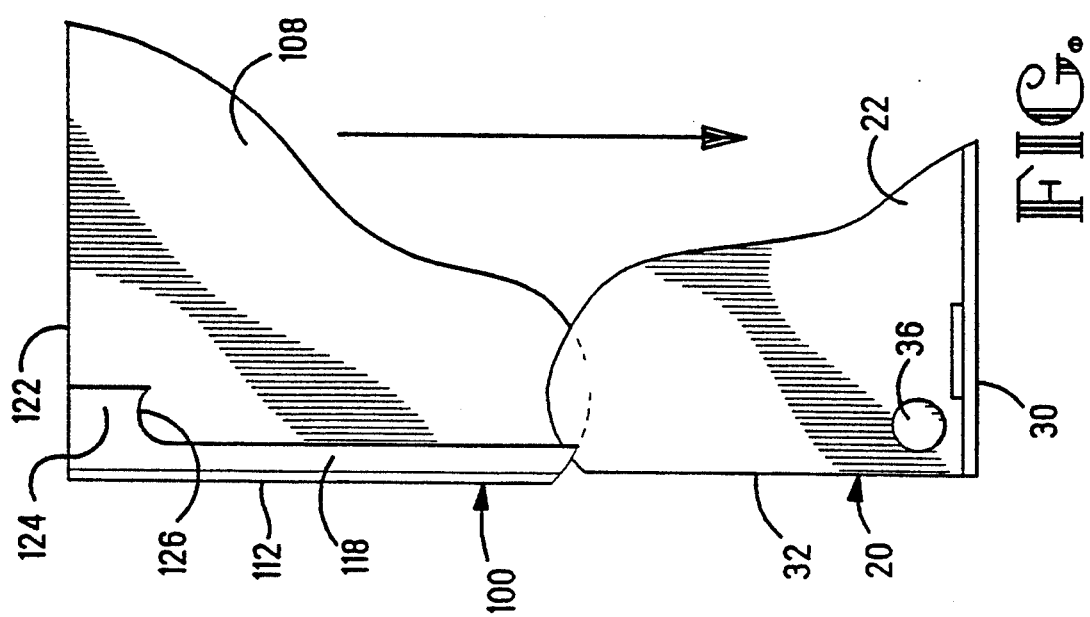

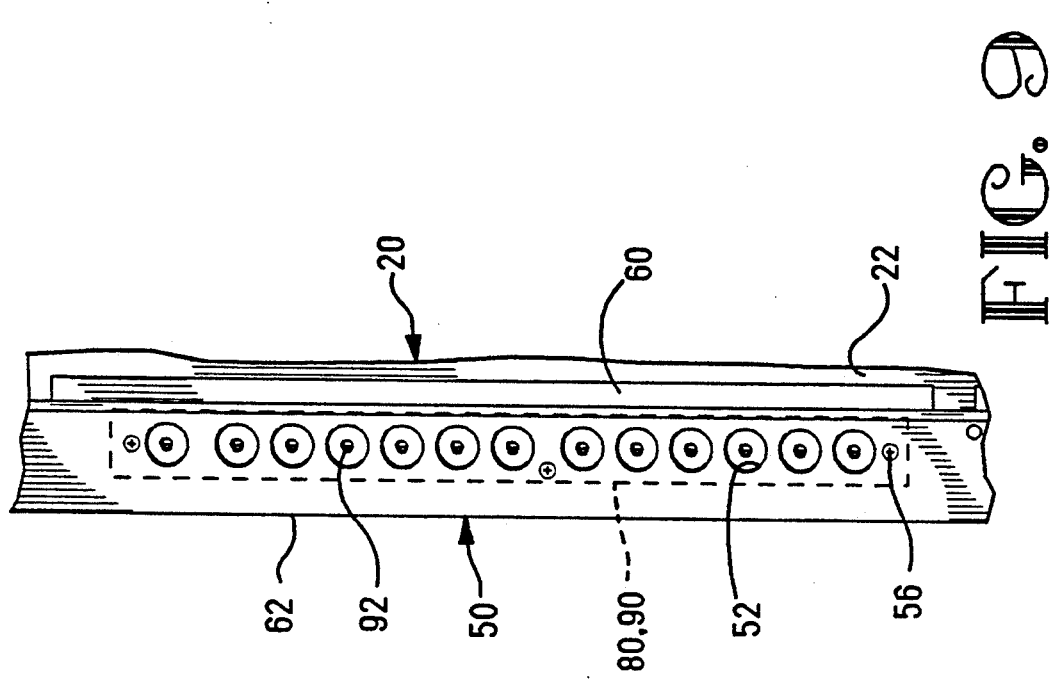
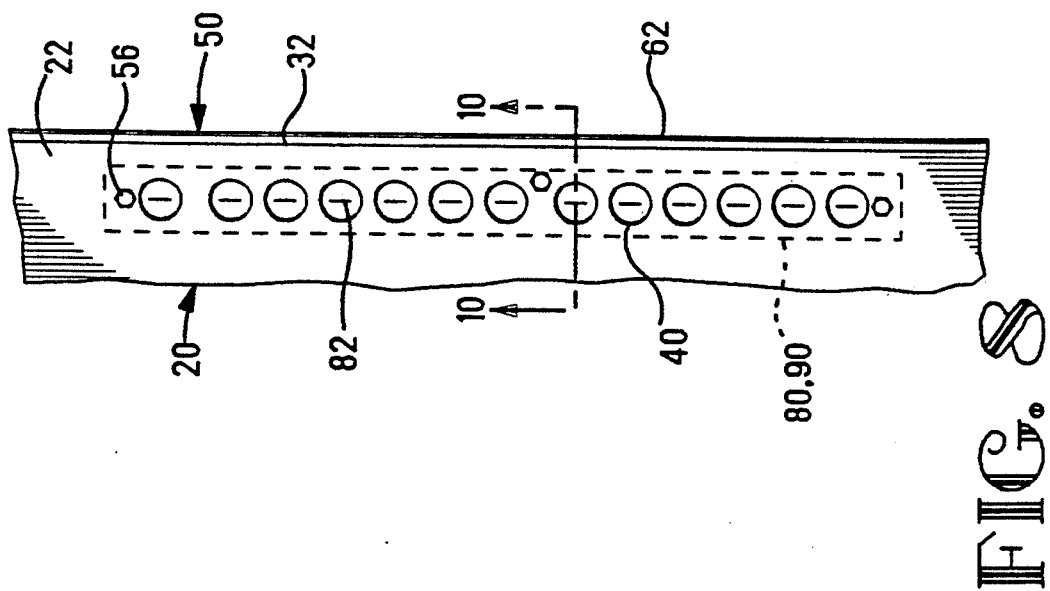

TELEPHONE JUNCTION ENCLOSURE AND SYSTEM FOR SEALING A WIRE OPENING ARRAY

FIELD OF THE INVENTION

This relates to the field of enclosures for electrical connections of wires for telephone service, and more particularly to vertically mounted enclosures which are openable to permit servicing.

BACKGROUND OF THE INVENTION

Junctions of main distribution lines of the telecommunications utility to service lines for individual customer sites are known in which terminals permit electrical connections of the lines to be made in the field, and a plurality of such terminals are mounted within a common enclosure for a plurality of such service lines. Such enclosures must not only be rugged and durable to provide general physical protection of the terminals and junctions but also must provide for protecting the junctions against moisture and against insects and animals especially at cable openings.

Specifications for such enclosures are proposed in Bellcore Technical Advisory TA-NWT-000014, Issue 3, November 1990, "Generic Requirements of Aerial Cable Terminals", issued by Bell Communications Research, Inc. Such requirements are directed toward protection of electrical connections between main distribution cables and service lines for long in-service use against all environmental effects commonly encountered, including precipitation, temperature extremes, corrosion, dust, debris, ultraviolet light, insects, rodents, reptiles and birds and so forth. Such enclosures must permit access for repair and servicing through use of relatively simple tools in procedures which are relatively not skill sensitive, and resist damage and tampering. Also such enclosures must themselves present no environmental or safety hazard.

Enclosures are commercially available, such as from Reliable Electric/Utility Products, Franklin Park, Ill. such as Wall/Pole mount closures having front covers which are hingedly mounted to the cabinet or rear panel, and in which the cable openings are individually grommeted. Raychem Corporation Telecommunications Division of Fuquay-Varina, NC provides a DTerminator PMT (trademark) in which the front cover is vertically slidable for access to the interior, wherein the front cover includes flanges along side edges thereof doubly-bent to define inwardly facing channels to receive side edges of the rear wall therein, with the front cover remaining attached to the rear panel after opening; the side edges of the rear wall include arrays of slots for cable openings, and a strip of molded elastomeric material is secured along and inwardly from each of the slotted side edges, with discrete sections extending through each slot and having cross-shaped perforated diaphragms for sealing the cable openings around the cables inserted therethrough.

SUMMARY OF THE INVENTION

The enclosure of the present invention comprises a rear panel member adapted to be mounted on a vertical structure such as a pole or a wall, and on which are mounted the arrays of terminals contained in respective silos of modular housings, and a front cover which is openable by being lowered vertically. Upper and lower walls of the enclosure are joined to the rear wall, while both side walls are joined to the front cover. Cable entries are provided through openings in the rear wall or the upper or lower walls or all of these, and these openings are sealed by members of elastomeric material which fit tightly around the insulative outer jacket of the cables or individual wires entering the enclosure.

Individual openings are provided through the rear wall in linear arrays along both side edges thereof to permit individual service wires to enter the enclosure from respective customer sites; a single grommeted opening through the upper wall permits sealed entry of an end of a multiconductor stub cable which extends to the main distribution cable extending to the central site of the telecommunications company; other openings are provided along the bottom wall for entry of ends of multiconductor service cables. A pair of generally plate-like brackets are mounted along the rearwardly facing outer surface of the rear wall along both sides thereof and opposing the arrays of cable openings therealong, with a corresponding array of cable openings therethrough aligned with the rear wall openings, with body sections of the brackets spaced from the rear wall. Strips of elastomeric material are secured between the brackets and the back wall for sealing about the cables when ends thereof are inserted into the enclosure in the field. A first strip adjacent the back wall surface includes discrete slits positioned between the aligned cable openings, while a second strip includes small diameter holes punched therethrough aligned with the centers of the aligned cable openings, with the diameter being selected to fit closely with the outer diameter or dimension of the insulated cable commonly used for service lines. Together the pair of strips define an effective seal around the cables upon insertion, and also close off any particular opening into which no wire is inserted.

The pair of plate-like brackets also include a flange extending laterally outwardly and therealong offset from the surface of the rear wall and along the edge thereof, to define together with an opposing portion of the rear wall a channel extending inwardly from the side edge for receipt of a corresponding flange extending inwardly from the rear edge of each of the side walls of the front cover in a manner which permits the front cover to be slid vertically with the pair of flanges disposed within respective channels which guide the movement of the front cover as it is lowered and raised. Upper ends of the front cover flanges include stop members which engage projections within the channels at lower ends to define a positive stop when the front cover has been fully lowered. The front cover also includes a bottom flange extending partially rearwardly to provide a mounting bracket for a standard fastening mechanism for securing and locking the front cover to the bottom wall of the rear panel upon full closure.

It is an objective of the present invention to provide a means for sealing the plurality of cable openings in an enclosure.

It is a further objective for such sealing means to be defined by integral gasket members to simultaneously seal a plurality of cable openings.

It is an additional objective to provide a system for sealing a wire-receiving opening about a wire inserted therethrough while sealing the opening even if no wire is inserted therethrough.

It is an additional objective for such a sealing system to be defined by easily replaceable parts facilitating field repair.

It is also an objective to provide a means for enabling guided lowering and raising of a front cover with respect to a rear panel of an enclosure.

It is yet a further objective to provide a simplified structure to provide an easily openable enclosure receiving ends of a plurality of electrical cables which is also sealed.

An embodiment of the present invention will now be disclosed by way of example with reference to the accompanying drawings.

BRIEF DESCRIPTION OF THE DRAWINGS

FIGS. 4 and 5 are bottom view illustrating the front cover and rear panel and both channel brackets and sealing members positioned to be fastened together in FIG. 4 and assembled in FIG. 5 respectively;

FIGS. 6 and 7 are diagrammatic partial views showing the cooperation of one of the pair of flanges of the front cover with a stop member at the bottom of the rear panel along the channel;

FIGS. 8 and 9 are front and rear views respectively of the arrays of cable openings along one side of the rear panel after assembly of the sealing members and channel bracket.

DETAILED DESCRIPTION OF THE PREFERRED EMBODIMENT

Figure 1:
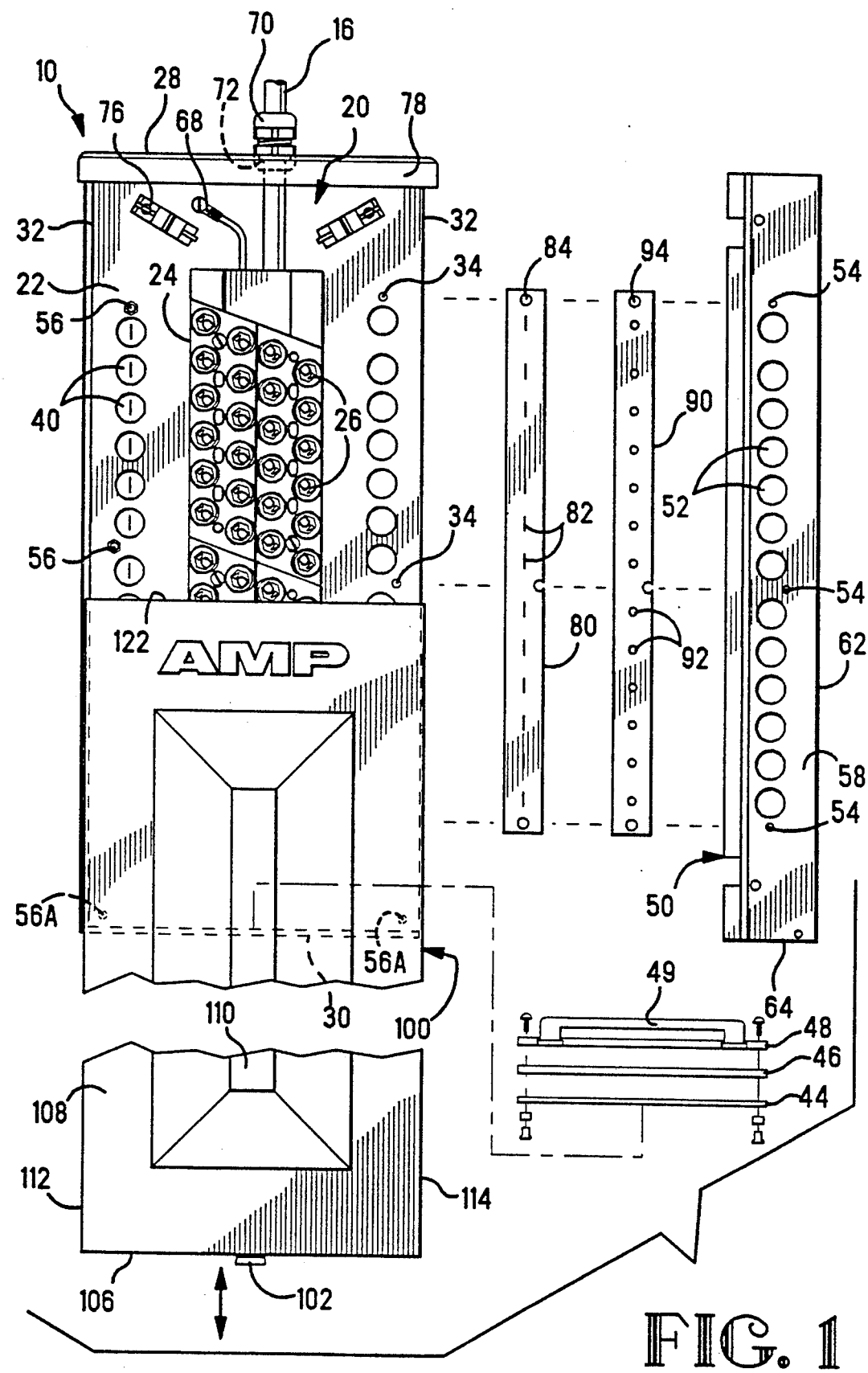
FIG. 1 is a front view of the enclosure of the present invention with the front cover partially lowered, and illustrating an array of terminal blocks mounted to the rear panel for eventual receipt of ends of respective electrical cables, and also showing brackets and sealing members exploded from one side and the bottom thereof.
Figure 2:
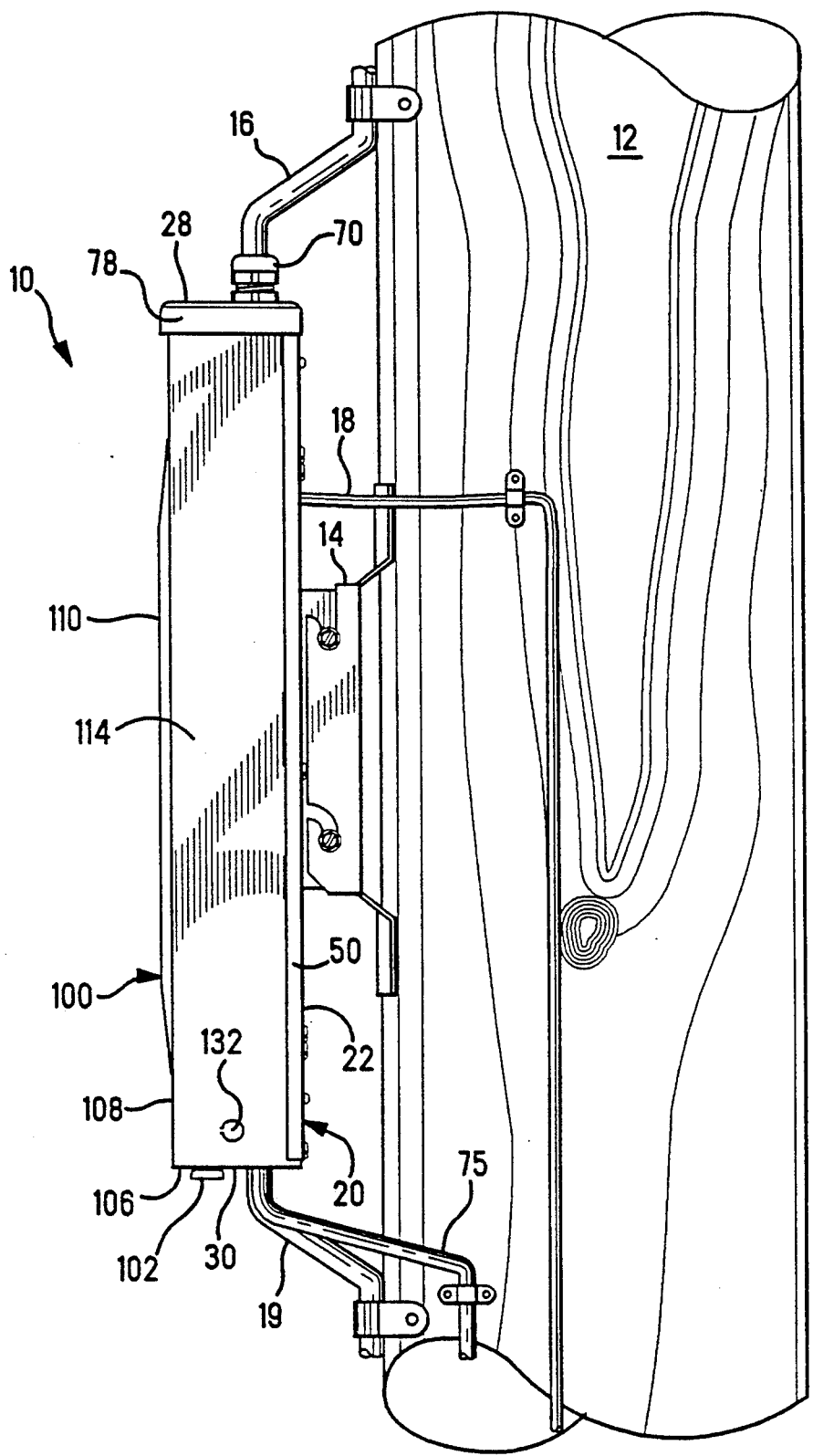
FIGS. 2 and 3 are side views of the enclosure of FIG. 1 mounted to a pole in closed and open conditions respectively, with a stub cable extending upwardly and representative service cables extending from rearwardly and downwardly therefrom.
Figure 3:
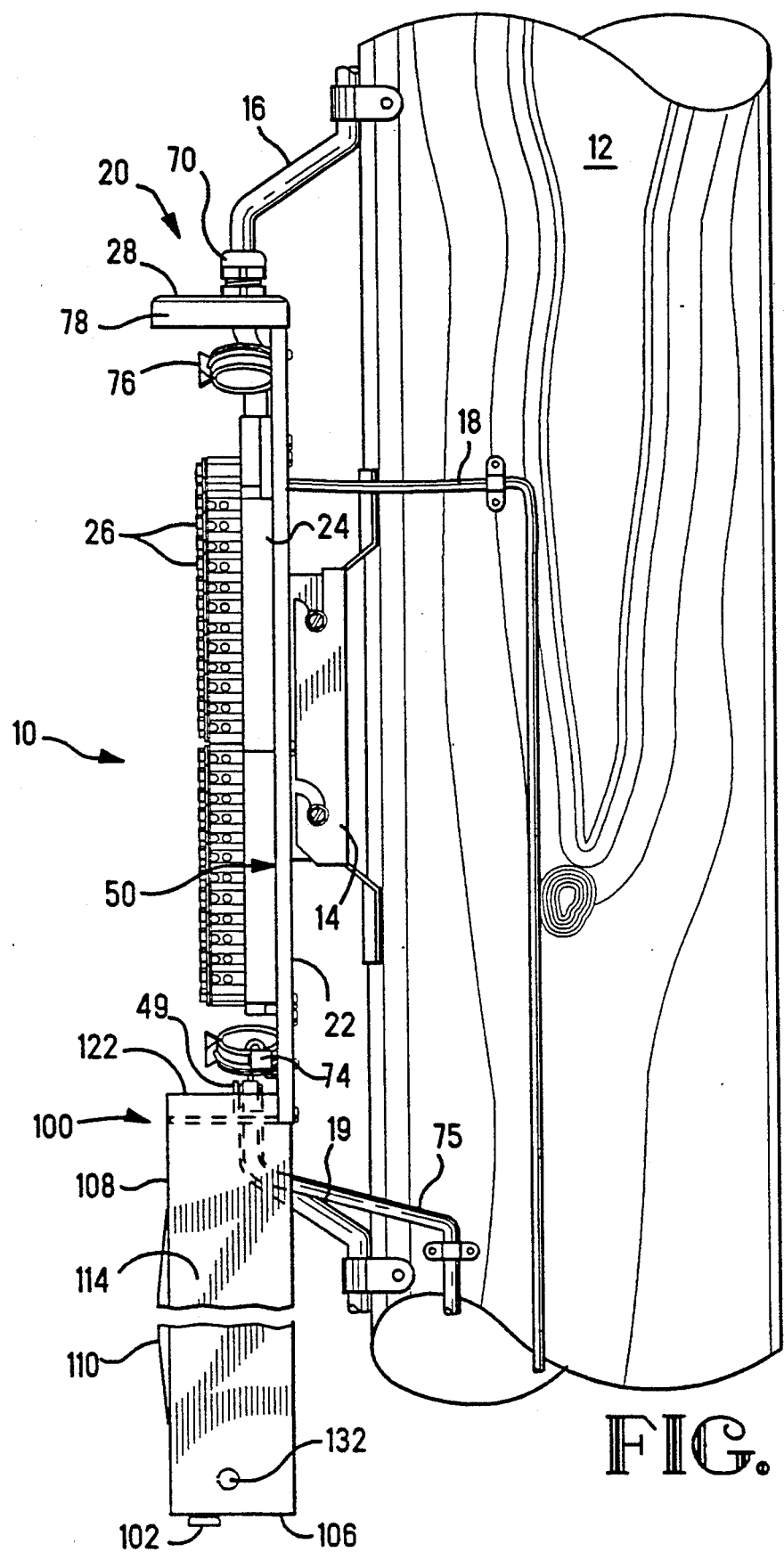

FIGS. 1 to 3 illustrate an enclosure 10 mountable vertically to a pole 12 at a junction site in the field by means of a mounting bracket assembly 14. A rear panel member 20 provides the rear wall 22 of the enclosure upon which are mounted arrays of terminal blocks 24 containing individually siloed terminals 26 to receive ends of a respective pair of conductor wires for interconnection therebetween. A front cover 100 is securable to rear panel 20 in a manner permitting it to be lowered for access to the terminal blocks after mounting for wire interconnection and other servicing when desired, as shown in FIG. 3. Front cover 100 includes a fastener assembly 102 along mounting flange 104 extending rearwardly from the bottom edge 106 of front wall 108 defined by front cover 100 as shown in FIGS. 4 and 5, to secure front cover 100 in its closed position with respect to rear panel 20, as shown in FIG. 2. A raised embossment 110 is preferably formed across the central region of front wall 108 to provide increased strength for resisting impact of foreign objects thereagainst after mounting. Circular perforations are provided at 130 and 132 defining knockouts to create openings if desired to enable securing accessories to pass therethrough, to assure that front cover 100 has not been opened by unauthorized persons, especially if enclosure 10 is mounted to a building wall.

An end of a length of stub cable 16 is shown entering upper wall 28 of enclosure 10 for individual conductor wires therein to be electrically connected to respective ones of the terminals, which is accomplished in the factory during enclosure assembly. A conventional grommet assembly 70 can be used to seal opening 72 around stub cable 16 and serves to clamp the cable insulation for strain relief to protect terminations of wires of cable 16 to respective terminals 26. Shielding of cable 16 is shown grounded to enclosure 10 at a ground post 68, with enclosure 10 grounded at post 74 to ground wire 75 (FIG. 3). Individual cable openings 40 through rear panel 20 are shown extending in linear arrays vertically along both sides of terminal blocks 24 for eventual receipt of ends of individual service wires 18 inserted therethrough from rearwardly of the enclosure, for conductors thereof to be terminated to respective ones of the terminals 26 for interconnection with corresponding ones of the stub cable wires. A representative individual service wire 18 and a representative multiwire service cable 19 (as well as ground wire 75) are illustrated in FIGS. 2 and 3, with wire 18 extending into a cable opening 40 through rear panel 20 and cable 19 and ground wire 75 entering a corresponding cable opening 42 through bottom wall 30 (best seen in FIGS. 4 and 5). Wires 18 and 75 and cables 19 commonly are clamped to the pole 12 and descend therealong until extending to a particular building, with ground wire 75 commonly extending to the ground. Within enclosure 10 ends of service wires 18,19 can extend directly to adjacent ones of terminals 26 or be dressed around terminal blocks 24 through wire management clips 76 to a remote terminal. Preferably rear panel member includes a vertical flange portion 78 extending downwardly just enough to envelope the top edge 122 of front cover member 20 when closed.

A channel bracket 50 is shown which is fastenable to the rear or outer surface of rear wall 22 of rear panel member 20 along each side edge 32 thereof to be superposed over the array of cable openings 40 and include associated cable openings 52 therethrough. First and second elastomeric substrates or sealing strips 80,90 are held between each channel bracket 50 and rear wall 22 of rear panel 20 to provide sealing of the cable openings around a cable inserted therethrough. Slits 82 are cut through sealing strip 80 to traverse respective ones of cable openings 40, and holes 92 are punched through sealing strip 90 aligned with the centers of respective cable openings 40. Apertures 54 extend through several spaced locations along each channel bracket 50 aligned with corresponding apertures 34 through rear wall 22 for fasteners 56, which also extend through holes 84,94 of sealing strips 80,90 also aligned with apertures 54. Similarly a bracket 48 for a pair of sealing strips 44,46 is mounted to and along bottom wall 30 in similar fashion. Bracket 48 preferably includes an upstanding bar 49 enabling conventional cable ties or clips to be secured therearound to provide strain relief for cables 19.

Rear panel member 20, front cover member 100 and brackets 50,48 can be formed of sheets of G90 galvanized steel having a durable finish coated thereover such as of polyurethane powder. Sealing strips 80,90,44,46 are preferably formed of ethylene-propylene diene monomer (EPDM) rubber, with strips 80,46 each having a thickness of about 0.125 inches and strips 90,44 each having a thickness of for example about 0.060 inches. Terminal blocks 24 may be of the type disclosed in U.S. Pat. No. 5,006,070. Fasteners 56,56A may be screws threaded into dual threaded female screws 57 pressfit into rear panel member 20, with standoffs 36 also threaded onto screws 57 (see FIG. 4) providing first and second embossments, such as Part No. SOS-032-8 sold by Penn Engineering and Manufacturing Corporation, Danboro, Pa. Front cover fastener assembly 102 mountable onto mounting flange 104 of front cover 100 is of a conventional design such as Part No. 44-029-69 sold by Penn Jacobson of Altoona, Pa. and having a tamper resistant flanged outer washer. Wire management clips 76 may be of the type sold as Part No. 220-6464000-03 by ITW Fastex, Wood Dale, Ill. Grommet assembly 70 may be a liquid-tight straight-through fitting such as Part No. 3219 sold by Heyco Products, Kenilworth, N.J. which clamps tightly against the cable insulation upon rotation therearound.

Referring to FIGS. 4 and 5, front cover 100 includes side walls 112,114 extending rearwardly from gently rounded corners 116 of front wall 108, and flanges 118,120 extending inwardly toward each other from rearward edges of side walls 112,114 and from top edge 122 to bottom edge 106. Channel brackets 50 include body sections 58 with offset panel-engageable wall sections 60 along inner edges thereof and upstanding side walls 62 which protrude a limited distance outwardly of side edges 32 of rear wall 22 when assembled. Along the bottom end of each channel bracket 50 is an upturned tab section 64 which passes by the bottom edge of rear wall 22. When mounted to rear panel 20 by fasteners 56, channel brackets 50 engage rear wall 22 by wall sections 60, and engage standoffs 36 by body section 58, to be secured spaced outwardly of rear wall 22 at side edges 32 and along cable openings 40, thus defining channels 66 and retention spaces for sealing strips 80,90 Bracket 48 (in phantom in FIGS. 4 and 5) is mounted in similar fashion to bottom wall 30 along cable openings 42 for multiwire service cables 19, securing sealing strips 44,46 along the inside surface of bottom wall 30.

Figure 10:
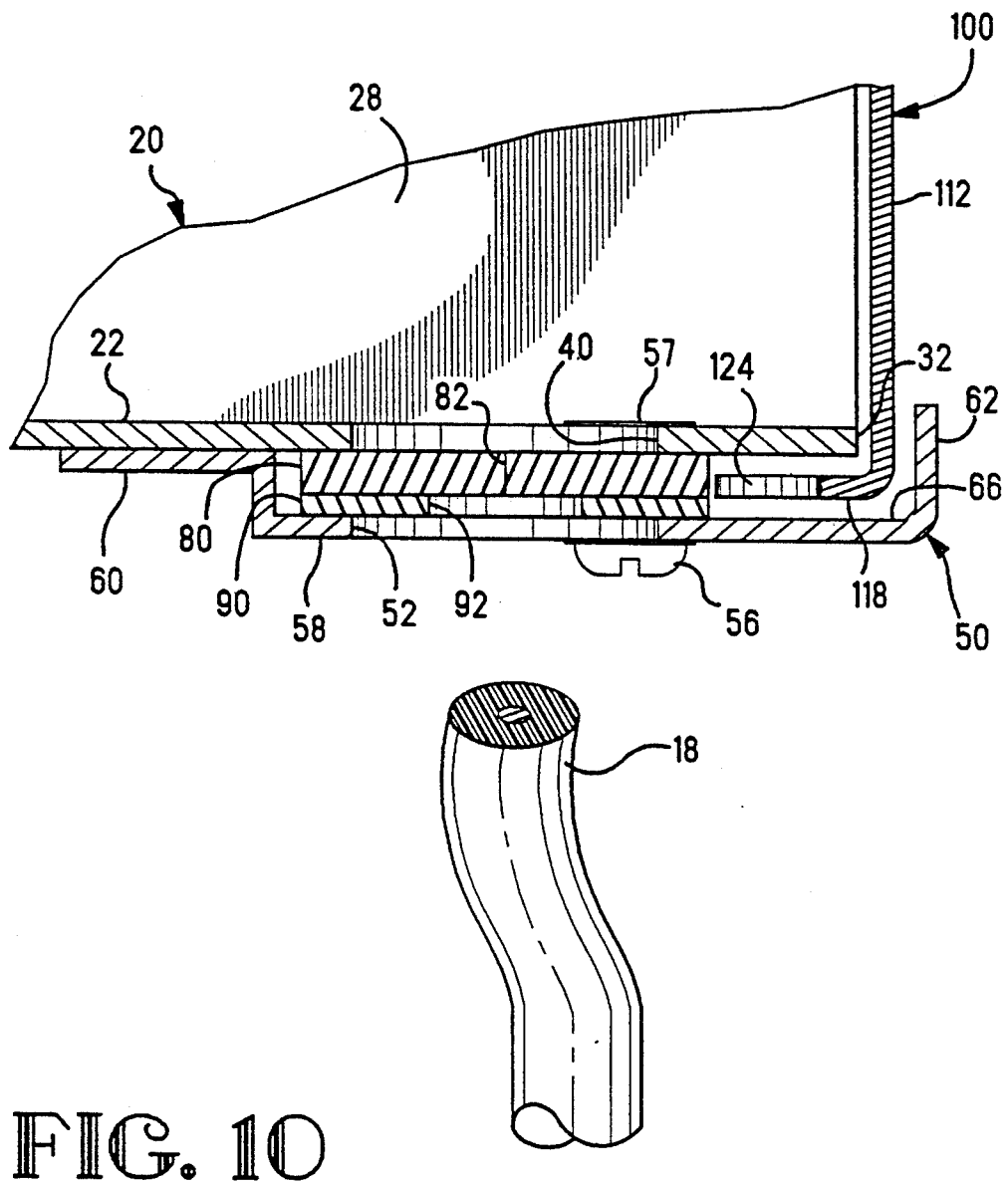
FIG. 10 is a cross-sectional view of a wire opening taken along line 10—10 of FIG. 8, with a service wire end positioned to be inserted therethrough.

Flanges 118,120 of front cover 100 are disposed within channels 66 in a manner permitting movement therealong, enabling front cover 100 to be lowered and raised as desired with respect to rear panel member 20. Upper ends of flanges 118,120 include tabs 124 extending farther inwardly from side walls 112,114 and defining stop members 126 cooperable with fasteners 56A proximate bottom edge 30 of rear wall 22, which are closer to side edges 32 of rear wall 22 than others of the fasteners 56. Reference is made to FIG. 10 which shows a flange 118 within a corresponding channel 66. In the event that front cover 100 becomes dented inwardly, the enclosure is adapted to permit continued lowering and raising, by means of the forward edge of bottom wall being notched (FIG. 4).

In FIGS. 8 and 9, cable openings 40 through rear wall 22 of rear panel member 20 are illustrated along one side thereof, with sealing strips 80,90 held in place by channel bracket 50; FIG. 8 is a view from inside enclosure 10 in which slits 82 of sealing member 80 are visible through openings 40 of rear wall 22, while FIG. 9 is from rearwardly thereof with sealing strip 90 visible through apertures 52 of channel bracket 50, and holes 92 thereof centered with respect thereto.

FIG. 10 is a cross-sectional view across the cable opening array and showing channel bracket 50 securing in place sealing strips 80,90, showing the alignment of a rear wall opening 40, a slit 82, a hole 92 and a bracket opening 52. Fasteners 56,56A extend through body section 58 of bracket 50 and are threaded into standoffs 36; together with wall section 60, standoffs 36 providing for body section 58 to be held a distance from the rear surface of rear wall 22 selected to be just enough for strips 80,90 to be disposed snugly therebetween. An end of a service wire 18 is illustrated positioned to be inserted through the aligned openings, through the sealing strips and into the enclosure to be terminated to a terminal therein. Also seen is a flange 118 of front cover member 100 in channel 66 defined by channel bracket 50 and rear panel member 20.

Other design modification and variations may occur to the artisan which are within the spirit of the invention and the scope of the claims. For example, the enclosure of the present invention may be utilized as a cross-connect enclosure where no stub cable nor related opening is necessary. And while the front cover and brackets of the specific embodiment disclosed are capable of permitting disassembly with simple tools for replacement of parts such as damaged sealing strips, other means of securing the members together may be utilized.

What is claimed is:

1. An enclosure for telephone wire junctions, comprising:
    a rear panel member adapted to be mounted to a structure and to have secured therein a plurality of terminal blocks for interconnecting associated conductors of wires;
    a front cover member secured to said rear panel member in a manner permitting movement between a closed position and an open position vertically therebeneath exposing said terminal blocks for interconnection procedures and servicing;
    a plurality of openings in said rear panel member for a plurality of respective service wires; and
    means sealing said plurality of openings;
    said rear panel member including a rear wall having opposed side edges and further including a top wall section and bottom wall section extending forwardly from upper and lower edges respectively of said rear wall, and said front cover member including a front wall and opposed side walls extending rearwardly from side edges of said front wall to inwardly directed flanges;
    said rear panel member including bracket members mounted along a rearwardly facing surface of said rear wall along respective side edges thereof, said bracket members defining guide channels along said side edges adapted to receive thereinto respective said inwardly directed flanges of said front cover member in a manner permitting said movement of said front cover member; and
    said rear panel member further including first embossments extending in said guide channels proximate said bottom wall along respective said side edges just inwardly of edges of said flanges of said front cover member, defining stop members cooperable with inwardly extending tabs of said flanges at top ends thereof,
    whereby said front cover member is stopped upon being lowered to define said open position and remains secured to said rear panel member in position to be raised into said closed position when desired.

2. An enclosure as set forth in claim 1 wherein said first embossments assist in fastening said brackets to said rear panel member.

3. An enclosure as set forth in claim 1 wherein said rear panel member includes second embossments spaced from said first embossments and extending rearwardly from said rearwardly facing surface of said rear wall farther inwardly from said side edges thereof than said first embossments, and said first and second embossments each having a length selected to define a depth of said guide channels sufficient to provide clearance for said flanges of said front cover member by abutting forwardly facing surfaces of said bracket members when assembled.

4. An enclosure as set forth in claim 3 wherein each said bracket include a body section extending parallel to said rearwardly facing surface of said rear wall, and a forwardly extending wall section along an inner edge of said body section having a height selected to position said body section a selected distance from said rearwardly facing surface of said rear wall, in cooperation with said first and second embossments.

5. An enclosure as set forth in claim 4 wherein said openings in said rear panel member include respective arrays thereof along and near each said side edge of said rear wall, each said bracket includes a corresponding array of openings through said body section aligned with one of said arrays of openings in said rear panel member upon assembly, and at least one strip of elastomeric material is disposed between each said bracket and said rearwardly facing surface of said rear wall between said aligned arrays of openings of said bracket and said rear panel member, each said at least one strip adapted to receive an end of a service wire inserted therethrough at any selected opening of said aligned arrays and sealing around said service wire, thereby sealing said opening.

6. An enclosure as set forth in claim 5 wherein each said at least one strip includes holes therethrough at least at two spaced locations along the length thereof aligned with corresponding ones of said second embossments and through which said corresponding second embossments extend, thereby holding each said at least one strip in position after assembly.

7. An enclosure as set forth in claim 5 wherein each said at least one strip includes a first strip including slits therethrough located to be aligned between said openings of said arrays in each said bracket and said rear panel member, said slits remaining closed if no said service wire is inserted therethrough.

8. An enclosure as set forth in claim 7 wherein each said at least one strip includes a second strip disposed adjacent and along a rearwardly facing surface of said first strip, each said second strip including wire-receiving holes therethrough located to be aligned between said openings of said arrays in each said bracket and said rear panel member, said wire-receiving holes being smaller in diameter than said openings of said arrays and centered with respect thereto.

9. An enclosure for telephone wire junctions, comprising:
a rear panel member adapted to be mounted to a structure and to have secured therein a plurality of terminal blocks for interconnecting associated conductors of wires;
a front cover member secured to said rear panel member in a manner permitting movement between a closed position and an open position exposing said terminal blocks for interconnection procedures and servicing;
at least one array of a plurality of openings in said rear panel member for receipt of a corresponding plurality of respective service wires;
said rear panel member including a bracket member mounted along an outer surface of a rear wall of said rear panel member traversing each said at least one opening array and spaced a selected distance from said outer surface, each said bracket member including a corresponding array of openings therethrough aligned with said at least one opening array in said rear panel member upon assembly; and
first and second strips of elastomeric material disposed between each said bracket member and said rearwardly facing surface of said rear wall between said arrays of openings of said bracket member and said rear panel member, each of said first and second strips adapted to receive an end of a service wire inserted therethrough at any selected opening of said arrays and sealing around said service wire, thereby sealing said opening;
said first strip including slits therethrough located to be aligned between said openings of said arrays in each said bracket and said rear panel member, said slits remaining closed if no said service wire is inserted therethrough, and
said second strip disposed adjacent and along a rearwardly facing surface of said first strip, said second strip including wire-receiving holes therethrough located to be aligned between said openings of said arrays in each said bracket and said rear panel member, said wire-receiving holes being smaller in diameter than said openings of said arrays and centered with respect thereto.

10. An enclosure as set forth in claim 9 wherein each of said first and second strips includes holes therethrough at least at two spaced locations along the length thereof aligned with fasteners fastening each said bracket member to said rear panel member and through which said fasteners extend, thereby holding first and second strips in position after assembly.

11. An enclosure as set forth in claim 9 wherein a wall includes an array of other openings for receiving multi-wire cables therethrough, and a said at least one strip is disposed along said array held against an inside surface of said wall by an other bracket member, and said other bracket member includes an upstanding bar laterally therealong for attachment of cable ties defining a strain relief arrangement for said multi-wire cables extending through said other openings.

12. A system for sealing an opening in an enclosure through which is to extend a wire, comprising:
a bracket member mountable to and spaced from a surface of a wall of said enclosure and including an opening corresponding to said opening in said enclosure;
a first elastomeric substrate disposed between said bracket member and said enclosure wall and including a slit therethrough transverse to said opening in said enclosure and said opening in said bracket member; and
a second elastomeric substrate disposed between said bracket member and said enclosure wall and including a hole therethrough aligned between said opening in said enclosure and said opening in said bracket member and exposing said slit of said first elastomeric substrate, said hole having a diameter selected to define a close fit with a said wire inserted therethrough, whereby said first and second elastomeric substrates define a means sealing said openings in said enclosure about a said wire inserted therethrough and also sealing said opening if no wire is inserted therethrough.

13. A system as set forth in claim 12 wherein said second elastomeric substrate is disposed along an outwardly facing surface of said first elastomeric substrate and is thereby adapted to receive a wire inserted through said enclosure opening from outwardly thereof.

14. A system as set forth in claim 13 wherein said bracket member is mounted along an outer surface of said enclosure.

* * * * *